US010112544B2

(12) United States Patent
Catlin et al.

(10) Patent No.: US 10,112,544 B2
(45) Date of Patent: Oct. 30, 2018

(54) VEHICLE ARMREST ASSEMBLY

(71) Applicant: Shanghai Yanfeng Jinqiao Automotive Trim Systems Co. Ltd, Plymouth, MI (US)

(72) Inventors: Michael Robert Catlin, Holland, MI (US); Tyler James Newkirk, Grand Rapids, MI (US); Craig David Flowerday, Holland, MI (US); David John McCarthy, Holland, MI (US)

(73) Assignee: Shanghai Yanfeng Jinqlao Automotive Trim Systems Co. Ltd., Novi, MI (US)

( * ) Notice: Subject to any disclaimer, the term of this patent is extended or adjusted under 35 U.S.C. 154(b) by 0 days.

(21) Appl. No.: 15/616,317

(22) Filed: Jun. 7, 2017

(65) Prior Publication Data

US 2017/0267183 A1    Sep. 21, 2017

Related U.S. Application Data

(63) Continuation of application No. PCT/US2015/064926, filed on Dec. 10, 2015.

(Continued)

(51) Int. Cl.
*B60R 7/04* (2006.01)
*B60R 11/02* (2006.01)
(Continued)

(52) U.S. Cl.
CPC .............. *B60R 7/04* (2013.01); *B60N 2/793* (2018.02); *B60R 11/0252* (2013.01); *B60R 2011/0007* (2013.01)

(58) Field of Classification Search
CPC .............. B60R 7/04; B60R 2011/0007; B60R 2011/0252; B60N 2/793
(Continued)

(56) References Cited

U.S. PATENT DOCUMENTS 7,168,750 B2 *  1/2007  Hutek ...................... B60R 7/04
                                                     296/37.8
7,686,364 B2 *  3/2010  Hehn ....................... B60R 7/04
                                                     220/812

(Continued)

FOREIGN PATENT DOCUMENTS

DE         19808381 A1      9/1999
DE         102013001789  *  8/2014  .............. B60R 7/04
DE         102013001789 A1  8/2014

OTHER PUBLICATIONS

Documents from the European Patent Register for EP Patent Application No. 15867126.3 current as of May 11, 2018 (in English) (108 pages).

(Continued)

*Primary Examiner* — Gregory A Blankenship

(57) ABSTRACT

A vehicle armrest assembly is disclosed. A component for a vehicle interior is also disclosed. The component may comprise a base comprising (1) a first divider configured to form a main compartment and a first side compartment and (2) a second divider configured to form the main compartment and a second side compartment; a cover configured to enclose the main compartment; a first door configured to enclose the first side compartment; and a second door configured to enclose the second side compartment. The cover may be configured to extend between the first divider and the second divider and move along the first divider and the second divider to uncover the main compartment.

20 Claims, 7 Drawing Sheets

Related U.S. Application Data

(60) Provisional application No. 62/090,289, filed on Dec. 10, 2014.

(51) Int. Cl.
 B60N 2/75 (2018.01)
 B60R 11/00 (2006.01)

(58) Field of Classification Search
 USPC .................................................... 296/24.34
 See application file for complete search history.

(56) References Cited

U.S. PATENT DOCUMENTS

| | | | |
|---|---|---|---|
| 8,033,588 B2* | 10/2011 | Luginbill | B60R 7/04 296/24.34 |
| 2002/0163215 A1 | 11/2002 | Emerling et al. | |
| 2003/0047955 A1* | 3/2003 | Bruhnke | B60R 7/04 296/37.8 |
| 2009/0072565 A1 | 3/2009 | Mayne, Jr. | |
| 2010/0078956 A1 | 4/2010 | Aebker et al. | |
| 2010/0090491 A1 | 4/2010 | Hipshier et al. | |
| 2011/0121596 A1* | 5/2011 | Beyer | B60N 3/10 296/24.34 |
| 2011/0227359 A1* | 9/2011 | Fesenmyer | B60N 3/101 296/24.34 |
| 2012/0074726 A1* | 3/2012 | Takai | B60N 2/793 296/24.34 |
| 2012/0091948 A1* | 4/2012 | Shinde | B60R 7/04 320/108 |
| 2013/0249231 A1* | 9/2013 | Winiger | B60R 7/04 296/24.34 |
| 2015/0197201 A1* | 7/2015 | Greiner | B60R 7/04 296/24.34 |
| 2015/0258923 A1* | 9/2015 | Skapof | B60R 7/04 296/24.34 |
| 2016/0339847 A1* | 11/2016 | Kodama | B60R 7/04 |
| 2017/0267183 A1* | 9/2017 | Catlin | B60R 7/04 |
| 2017/0306664 A1* | 10/2017 | Saikawa | B60N 3/102 |
| 2018/0194295 A1* | 7/2018 | Jones | B60R 7/04 |

OTHER PUBLICATIONS

International Search Report for International Application No. PCT/US2015/064926 dated Feb. 23, 2016.
Written Opinion for International Application No. PCT/US2015/064926 dated Feb. 23, 2016.

* cited by examiner

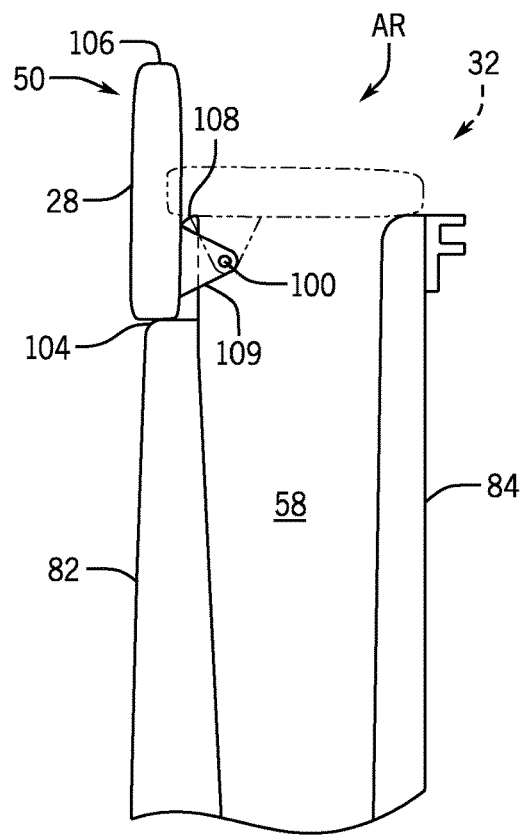
FIG. 6A
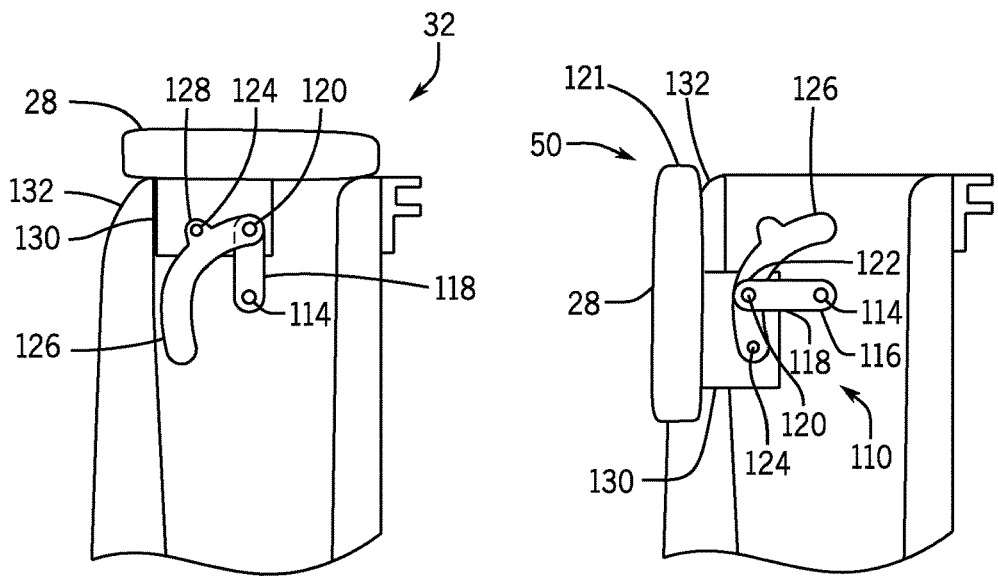
FIG. 6B
FIG. 6C

VEHICLE ARMREST ASSEMBLY

CROSS REFERENCE TO RELATED APPLICATIONS

The present application is a continuation of International Application No. PCT/US15/64926 titled "VEHICLE ARMREST ASSEMBLY" filed Dec. 10, 2015.

The present application claims priority from and the benefit of the following applications: (a) International Application No. PCT/US15/64926 titled "VEHICLE ARMREST ASSEMBLY" filed Dec. 10, 2015; (b) U.S. Provisional Patent Application No. 62/090,289 titled "VEHICLE ARMREST ASSEMBLY" filed Dec. 10, 2014. These applications are hereby fully incorporated by reference in their entirety.

FIELD

The present invention relates to a vehicle armrest assembly. The present invention also relates to vehicle interior components for a vehicle armrest assembly.

BACKGROUND

It is well-known to include storage volumes in a vehicle interior. An overhead console may include a storage compartment suitable for storing sunglasses, driving glasses, or other items. Other storage compartments may be located within a center console, a seat, a door panel, or other areas of the vehicle interior.

It would be advantageous to provide a storage compartment that enables access to certain storage volumes and that facilitates organization and storage of certain items, such as laptops and notebooks.

SUMMARY

The present invention relates to a component for a vehicle interior. The component may comprise a base comprising (1) a first divider configured to form a main compartment and a first side compartment and (2) a second divider configured to form the main compartment and a second side compartment. A cover may be configured to enclose the main compartment; a first door may be configured to enclose the first side compartment; a second door may be configured to enclose the second side compartment. The cover may be configured to extend between the first divider and the second divider and move along the first divider and the second divider to uncover the main compartment. The cover may be configured to move along a path between a cover closed position that substantially covers the main compartment and a cover open position that substantially uncovers the main compartment. At least one of the first door and the second door may be configured to rotate about an axis substantially parallel to the path of movement of the cover between (a) a door closed position that substantially covers at least one of the first side compartment and the second side compartment and (b) a door open position that substantially uncovers the at least one of the first side compartment and the second side compartment. The first divider may comprise a first track and the second divider may comprise a second track. The cover may be configured to engage the first track and the second track. The first door may be configured to move between (a) a door closed position to enclose the first side compartment and (b) a door open position to uncover the first side compartment. The cover may be configured to move in order to enclose and uncover the main compartment when the first door is in the door closed position and the door open position. The base may comprise a first wall and a second wall laterally opposed to the first wall. The first door may be coupled to the first wall by a hinge. The first door may be configured to engage the first divider when the first door is in the door closed position to substantially cover the first side compartment. The first door may be configured to (a) pivot relative to the first wall and (b) slide along the first wall as the first door moves from the door closed position to the door open position. The base may comprise a first wall and a second wall laterally opposed to the first wall. The first door may be coupled to the first divider by a hinge. The first door may be configured to engage the first wall when the first door is in the door closed position to substantially cover the first side compartment. The first door may comprise a mechanism configured to secure the first door to the first wall.

The present invention also relates to a component for a vehicle interior. The component may comprise a base having a main compartment and a side compartment; a divider of the base configured to form the main compartment and the side compartment; a cover configured to move along a path between a cover closed position that substantially covers the main compartment and a cover open position that substantially uncovers the main compartment; and a door configured to move between a door closed position that substantially covers the side compartment and a door open position that substantially uncovers the side compartment. The door may be configured to rotate about an axis substantially parallel to the path of movement of the cover.

The cover may be configured to move between the cover closed position and the cover open position when the door is in the door closed position and when the door is in the door open position. The base may comprise a wall; the door may be configured to extend between the wall and the divider in the door closed position. The base may comprises a wall; the door may be coupled to the wall by a hinge; the door may be configured to engage the divider when the door is in the door closed position to substantially cover the side compartment. The hinge may comprise at least one of (a) an offset pivot and/or (b) a pivot assembly comprising a fixed pivot and at least one movable pivot. The base may comprise a wall; the door may be coupled to the divider by a hinge; the door may be configured to engage the wall when the door is in the door closed position to substantially cover the side compartment. The cover and the door may comprise an armrest assembly.

The present invention further relates to a vehicle armrest system. The vehicle armrest system may comprise a support structure having a first outer storage compartment, a second outer storage compartment, and a central storage compartment disposed between the first outer storage compartment and the second outer storage compartment. The vehicle armrest system may also comprise an armrest assembly coupled to the support structure. The armrest assembly may comprise a first armrest configured to cover and uncover the first outer storage compartment and a second armrest configured to cover and uncover the second outer storage compartment. The armrest assembly may further comprise a cover; the cover may be configured to move relative to the support structure to enable access to the central storage compartment. The support structure may comprise a first interior wall and a second interior wall laterally opposed to the first interior wall. The first interior wall and the second interior wall may be configured to separate the central storage compartment from the first outer storage compartment and the second outer storage compartment. The cover may be supported by a first track extending along the first interior wall and a second track extending along the second interior wall. The cover may be configured to move along a direction relative to the support structure to enable access to the central storage compartment. The first armrest may be configured to rotate about an axis substantially parallel to the direction of movement of the cover. The first armrest and the second armrest may be independently, pivotally coupled to the support structure and configured to independently rotate relative to the support structure to enable access to the first outer storage compartment and the second outer storage compartment, respectively.

FIGURES

FIG. 6A is a schematic cross-sectional view of a portion of an armrest assembly according to an exemplary embodiment.

FIG. 6B is a schematic cross-sectional view of a portion of an armrest assembly according to an exemplary embodiment.

FIG. 6C is a schematic cross-sectional view of a portion of an armrest assembly according to an exemplary embodiment.

DESCRIPTION

Figure 1A:
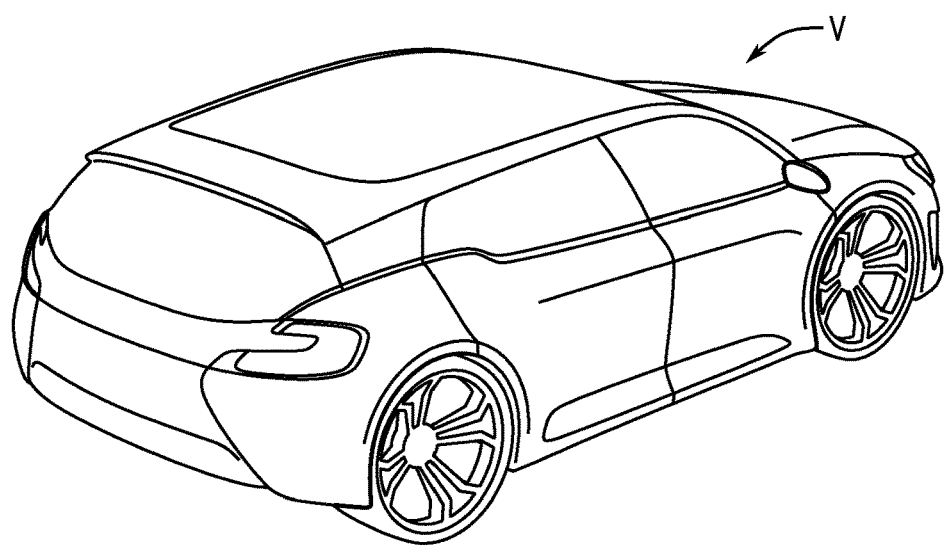
FIG. 1A is a schematic perspective view of a vehicle according to an exemplary embodiment.
Figure 1B:
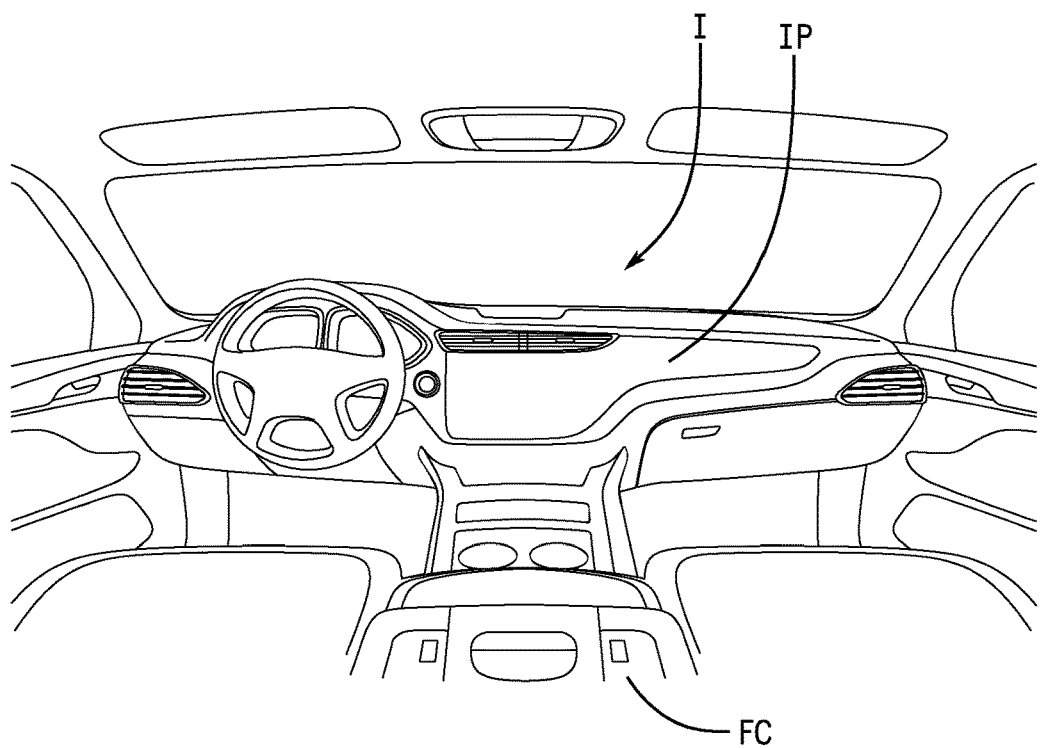
FIG. 1B is a schematic view of a vehicle interior according to an exemplary embodiment.
Figure 1C:
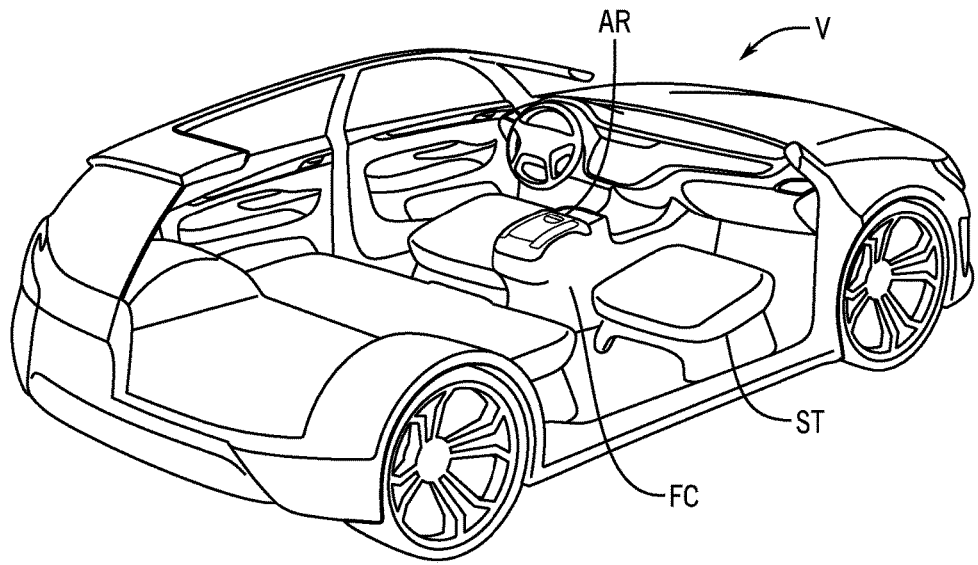
FIG. 1C is a schematic perspective view of a vehicle interior according to an exemplary embodiment.

As shown schematically in FIGS. 1A to 1C, a vehicle V is shown according to an exemplary embodiment; the vehicle V includes an interior volume I in which various components for a vehicle interior are situated, such as seats ST and a floor console FC. According to an exemplary embodiment as shown schematically in FIG. 1C, the floor console FC may include an armrest assembly AR. According to an exemplary embodiment, the floor console FC may be positioned between seats ST of the vehicle V.

Figure 2:
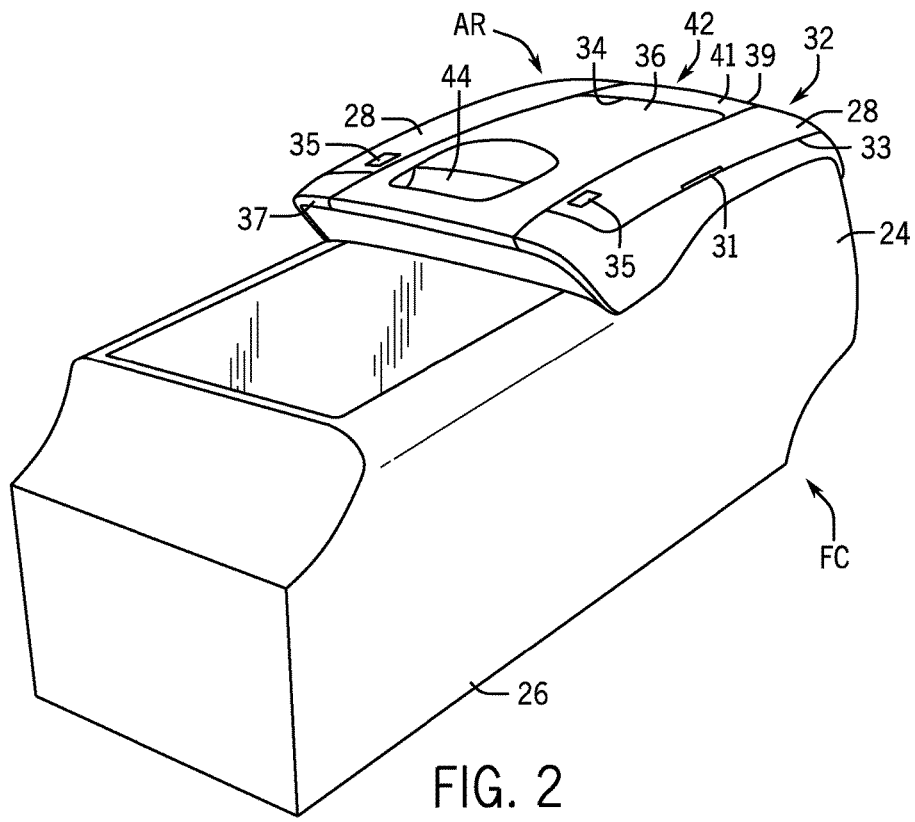
FIG. 2 is a schematic perspective view of an armrest assembly according to an exemplary embodiment.

According to an exemplary embodiment as shown schematically in FIG. 2, the floor console FC may include an armrest assembly AR. The armrest assembly AR may be generally supported by the floor console FC. The floor console FC may include a base 24 on which the armrest assembly AR is disposed. According to an exemplary embodiment, the base 24 may be part of the floor console FC, or the base 24 may be part of a sub-assembly secured to the floor console FC during final assembly. A bottom portion 26 of the base 24 may include all or a portion of the floor console FC to be secured to the vehicle V. The base 24 may include one or more interior compartments (e.g., storage compartments or storage volumes) configured to retain various items, such as documents, glasses, and/or portable electronic devices (e.g., laptop computers and/or tablets).

According to an exemplary embodiment as shown schematically in FIG. 2, the armrest assembly AR may include a first door 28 (e.g., a first armrest portion) and a second door 28 (e.g., a second armrest portion). According to an exemplary embodiment, the first door 28 and the second door 28 may be configured to independently move (e.g., pivot) from a closed position 32 to an open position. In the closed position 32, the first door 28 and the second door 28 may substantially cover (e.g., conceal or block access to) one or more corresponding side compartments (e.g., laterally outer storage compartments) within the base 24. In the open position, the first door 28 and the second door 28 may substantially uncover (e.g., expose or enable access to) an interior of the one or more corresponding side compartments within the base 24. For example, a vehicle occupant may open the first door 28 and/or the second door 28 to access items within the one or more corresponding side compartments, and the vehicle occupant may close the first door 28 and/or the second door 28 to block access to the one or more corresponding storage compartments.

According to an exemplary embodiment, the first door 28 and the second door 28 may be pivotally coupled to the base 24 via respective hinges 31 and may rotate between the closed position and the open position about the hinges 31. According to an exemplary embodiment as shown schematically in FIG. 2, the hinges 31 may be disposed at respective laterally outer edges 33 of the first and second doors 28. According to an exemplary embodiment, the vehicle occupant may independently open and close the first and second doors 28 by independently rotating the first and second doors 28 about the respective hinges 31. According to an exemplary embodiment, a mechanism 35 (e.g., a coupling structure or a latch), such as a paddle or push style latch, may be provided on the first and second doors 28 and/or on the base 24 and may enable the vehicle occupant to release (e.g., unlatch or unlock) the first and second doors 28 from the base 24 and rotate the first and second doors 28 relative to the base 24. According to an exemplary embodiment, an over center latch may include a spring to bias the first or second doors 28 toward the closed position 32 when the first or second doors 28 are substantially closed. According to an exemplary embodiment, an inertia latch may couple the first or second doors 28 to the base 24 to lock the first or second doors 28 to the base 24 in response to certain changes in acceleration (e.g., during a vehicle crash). According to an exemplary embodiment, the mechanism 35 may be provided in any location and may have any form.

According to an exemplary embodiment as shown schematically in FIG. 2, the first door 28 and the second door 28 may be disposed on generally opposite lateral sides of an opening 34 of the armrest assembly AR. According to an exemplary embodiment, a cover 36 may be positioned within the opening 34 of the armrest assembly AR. According to an exemplary embodiment, the cover 36 may extend between the first divider 84 and the second divider 84 (see FIG. 5A) and move along the first and second doors 28 to uncover the opening 36. According to an exemplary embodiment, the cover 36 may be a tambour door. According to an exemplary embodiment, the cover 36 may be configured to slide relative to the base 24 in a first direction (e.g., a rearward direction) along a path from a closed position 42 to an open position. The closed position 42 may substantially cover (e.g., conceal or block access to) one or more corresponding main compartments within the base 24; the open position may substantially uncover (e.g., facilitate access to) the one or more corresponding main compartments. According to an exemplary embodiment, the cover 36 may also be configured to slide relative to the base 24 in a second direction (e.g., a forward direction) along the path from the open position to the closed position 42. According to an exemplary embodiment, the vehicle occupant may slide the cover 36 in the rearward direction, substantially uncovering the one or more corresponding main compartments and allowing access to items within the one or more corresponding main compartments; the vehicle occupant may slide the cover 36 in the forward direction to substantially cover the one or more corresponding main compartments and block access to the one or more corresponding main compartments. The first door 28, the second door 28, and the cover 36 may selectively facilitate and block access to the one or more compartments. According to an exemplary embodiment, the cover 36 includes a mechanism 44 (e.g., a coupling structure or a latch) that may be removably coupled to a corresponding latch of the base 24 or of the armrest assembly AR. The mechanism 44 may have any form and may generally enable the vehicle occupant to release (e.g., unlock or unlatch) the cover 36 from the base 24 and to slide the cover 36 relative the base 24.

According to an exemplary embodiment as shown schematically in FIG. 2, the armrest assembly AR may extend from a forward end 37 to a rear end 39. According to an exemplary embodiment, the first door 28 and the second door 28 may extend on opposite lateral sides of the opening 34 and may be generally parallel to one another. According to an exemplary embodiment, the first door 28 and the second door 28 may extend fully or partially between the forward end 37 and the rear end 39 of the armrest assembly AR. According to an exemplary embodiment, the armrest assembly AR may include a cross-piece 41 (e.g., a rear cross-piece) positioned at the rear end 39 of the armrest assembly AR and extending cross-wise (e.g., laterally) between the first and the second doors 28. According to an exemplary embodiment, the cross-piece 41 may cover or conceal at least a portion of the cover 36 and related components that support the cover 36.

According to an exemplary embodiment, one or more portions of the armrest assembly AR (e.g., the first door 28, the second door 28) may be padded. According to an exemplary embodiment, various components of the armrest assembly AR may be made of an injection moldable plastic material. According to an exemplary embodiment, the cover 36 may comprise a padded material, a hard material, or a flexible material. According to an exemplary embodiment, the one or more portions of the armrest assembly AR (e.g., the first door 28, the second door 28) and/or the cover 36 may be wrapped in leather, vinyl, fabric, or integral skin. According to an exemplary embodiment, the armrest assembly AR and/or the cover 36 may comprise foam. According to an exemplary embodiment, various components of the armrest assembly AR may be formed from one or more of a metal, a metal alloy, carbon fiber, and/or plastic. According to an exemplary embodiment, one or more portions of the armrest assembly AR (e.g., the first door 28, the second door 28) may be padded and may be formed from a relatively soft material. According to an exemplary embodiment, the cover 36 may be formed from a relatively hard material. According to an exemplary embodiment, a visible top surface of the first and second doors 28 of the armrest assembly AR may be generally flush with a visible top surface of the cover 36. According to an exemplary embodiment, the first and second doors 28 may have side walls that extend above the cover 36; the cover 36 may be recessed relative to the first and second doors 28 of the armrest assembly AR.

According to an exemplary embodiment, the open position for the first door 28 may be achieved by moving (e.g., rotating or pivoting) the first door 28 relative to the base 24. According to an exemplary embodiment, the first door 28 and the second door 28 may be independently, pivotally coupled to the base 24 via respective hinges 31 disposed at respective laterally outer edges 33.

Figure 3A:
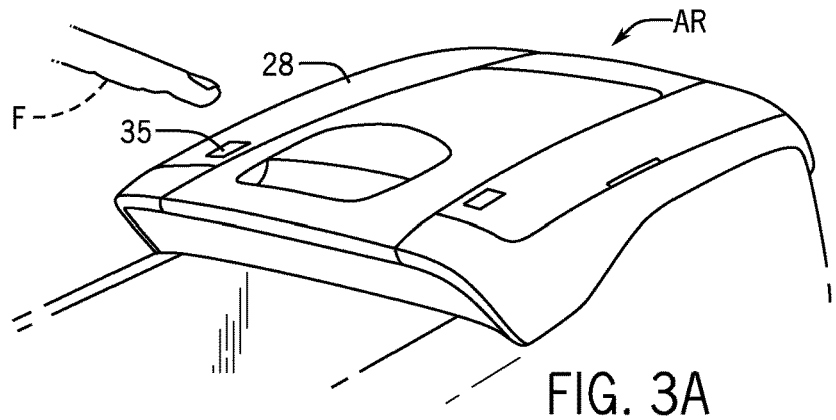
FIGS. 3A through 3C are schematic perspective views of an armrest assembly according to an exemplary embodiment.
Figure 3B:
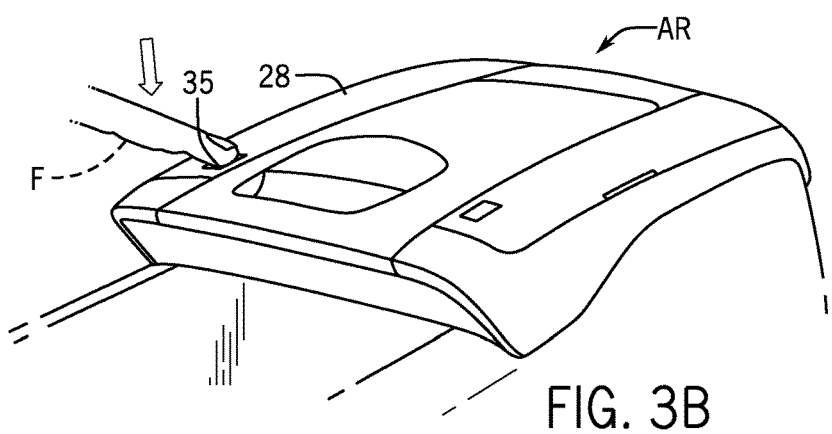
Figure 3C:
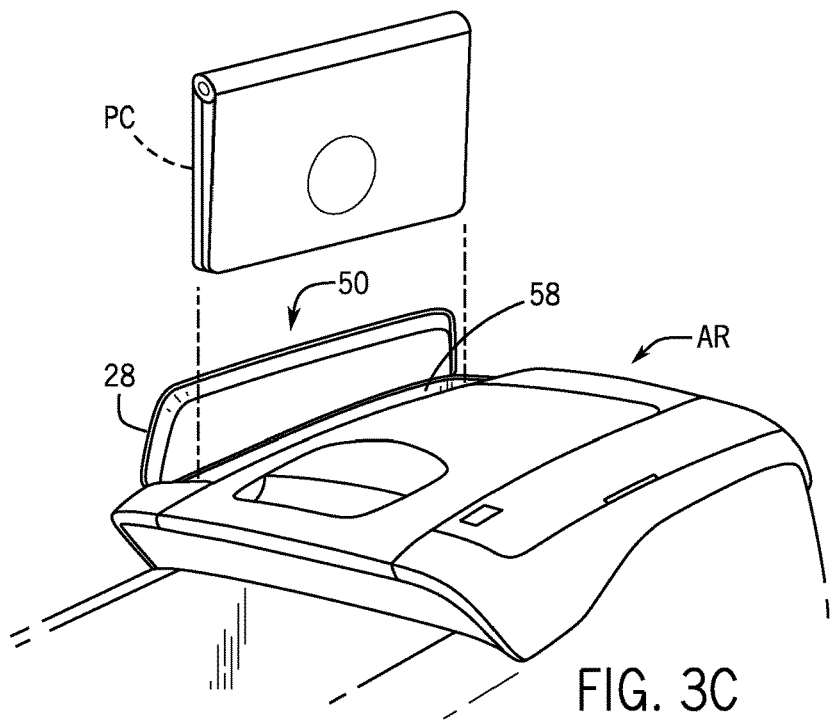

According to an exemplary embodiment as shown schematically in FIGS. 3A to 3C, a vehicle occupant may depress the mechanism 35 with a finger F to unlatch and rotate the first door 28 in a first direction about a first axis (e.g., a first longitudinal axis) and move the first door 28 from the closed position 32 (see FIG. 2) to the open position 50 to expose a first side compartment 58 of the base 24. According to an exemplary embodiment, the first side compartment 58 may be a generally narrow compartment and may be configured to receive and store one or more substantially narrow items, such as documents, a laptop computer, a tablet, or the like. According to an exemplary embodiment, the first side compartment 58 may receive a laptop PC for storage. According to an exemplary embodiment, rotation of the first door 28 in a second direction about the first axis may move the first door 28 from the open position 50 to the closed position 32 and may substantially cover the first side compartment 58 of the base 24. Rotation of the second door 28 in the second direction about a second axis (e.g., a second longitudinal axis), which is generally parallel to the first axis according to an exemplary embodiment, may move the second door 28 from the closed position 32 to the open position, and rotation of the second door 28 in the first direction about the second axis may move the second door 28 from the open position to the closed position 32. According to an exemplary embodiment, the first axis and second axis may be substantially parallel to a path of movement of the cover 36.

Figure 5A:
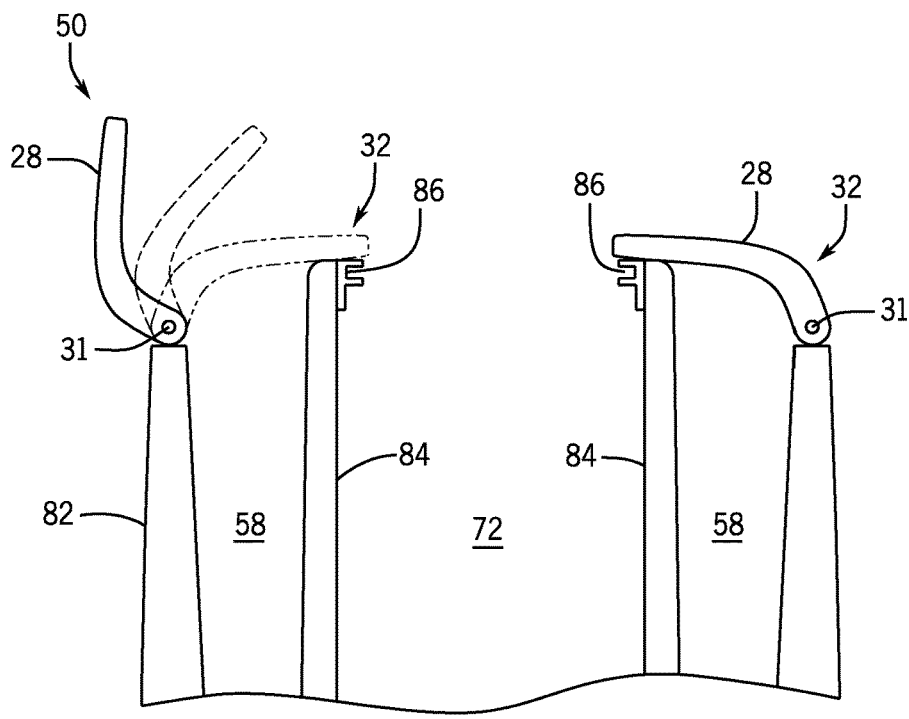
FIG. 5A is a schematic cross-sectional view of an armrest assembly according to an exemplary embodiment.

According to an exemplary embodiment as shown schematically in FIGS. 2 and 5A, the hinges 31 may be located at respective laterally outer edges 33 of the first door 28 and the second door 28. According to an exemplary embodiment, the hinges 31 may be positioned at respective laterally inner edges (e.g., the hinge 31 may extend along a longitudinal axis of the base 24). According to an exemplary embodiment, the hinges 31 may be positioned at respective rear edges (e.g., the hinge 31 may extend along a lateral axis of the base 24) and each of the doors 28 may independently rotate about the respective hinges 31 at the rear edge to move the first and second doors 28 between the open position 50 and the closed position 32. According to an exemplary embodiment, the hinges 31 may include simple pivots, offset pivots, or multiple pivots. According to an exemplary embodiment, one side compartment 58 may be provided under the first door 28 and/or under the second door 28 or multiple side compartments may be provided under each of the first door 28 and/or under the second door 28. According to an exemplary embodiment, the armrest assembly AR may include more than two movable doors 28 each configured to enable access to at least one side compartment 58. According to an exemplary embodiment, two separate and independently movable doors may be disposed on one lateral side of the armrest assembly AR between the forward end 37 and the rear end 39; one door may enable access to a first side compartment (e.g., a forward compartment), and another door may enable access to a second side compartment (e.g., a rearward compartment).

Figure 4A:
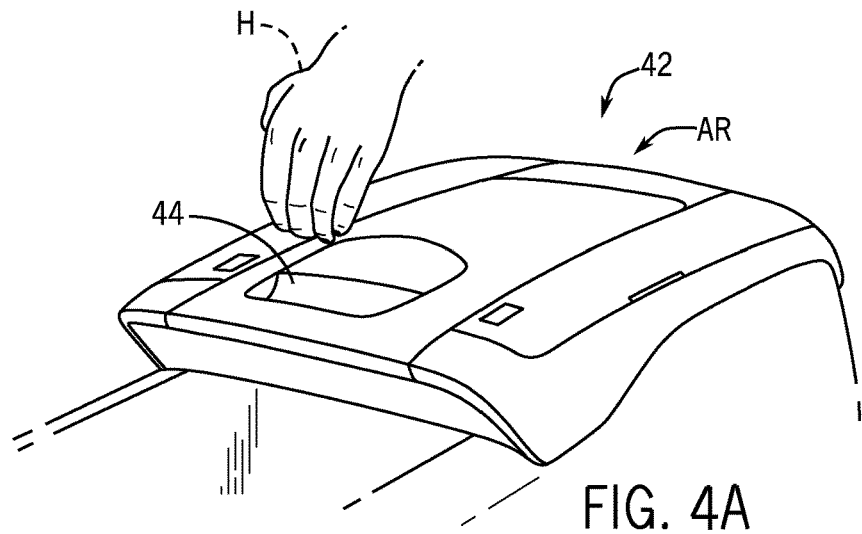
FIGS. 4A through 4C are schematic perspective views of an armrest assembly according to an exemplary embodiment.
Figure 4B:
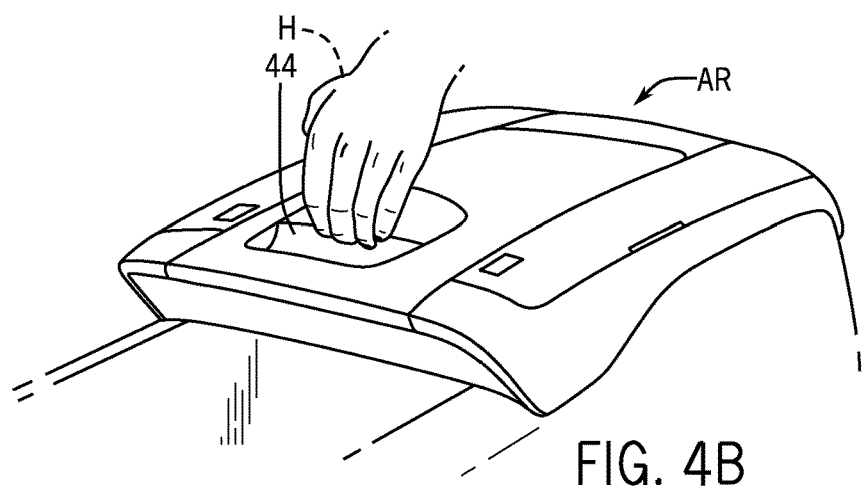
Figure 4C:
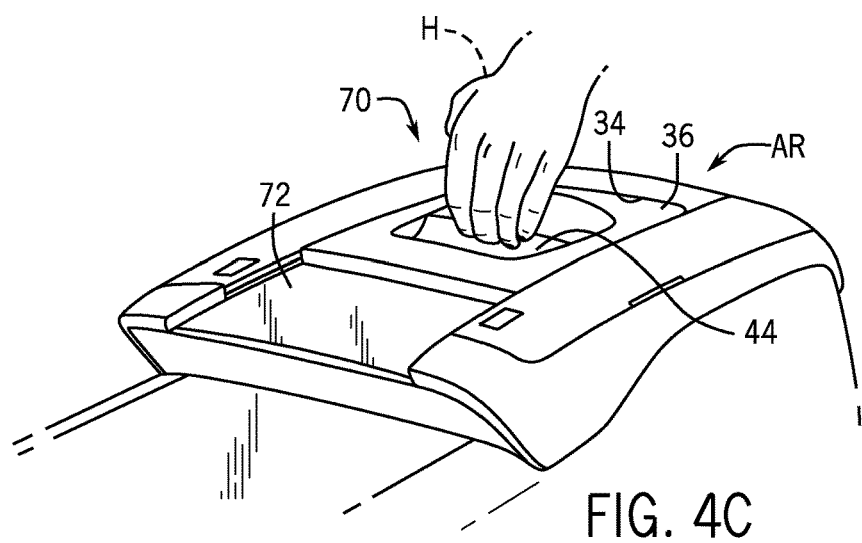

According to an exemplary embodiment as shown schematically in FIGS. 4A through 4C, the cover 36 may be moved from the closed position 42 to the open position 70 to expose one or more corresponding main compartments 72 (e.g., central storage compartments). According to an exemplary embodiment, the cover 36 may be independently moved by the vehicle occupant's hand H along opening 34 by pulling the cover 36 and mechanism 44 in the rearward direction to expose the one or more corresponding main compartments 72 and by pulling the cover 36 and mechanism 44 in the forward direction to enclose the one or more corresponding main compartments 72. According to an exemplary embodiment, the cover 36 may be moved independently of the first and second doors 28 of the armrest assembly AR; the cover 36 may be moved while one or more of the first and second doors 28 of the armrest assembly AR are in the closed position or the open position.

According to an exemplary embodiment as shown schematically in FIG. 5A, the base 24 may include a wall 82 (e.g., laterally opposed outer walls) and first and second dividers 84 (e.g., laterally opposed inner walls). According to an exemplary embodiment, the first and second dividers 84 may form the main compartment 72 and the respective first and second side compartments 58. According to an exemplary embodiment, the main compartment 72 may be located adjacent to at least one of the first and second side compartments 58. According to an exemplary embodiment, the main compartment 72 may be located between (e.g., along a lateral axis of the base 24) the first and second side compartments 58. The first side compartment 58 and the second side compartment 58 may be disposed between a respective wall 82 and a respective divider 84. According to an exemplary embodiment, the main compartment 72 may be disposed between the first and second dividers 84.

According to an exemplary embodiment as shown schematically in FIG. 5A, each of the dividers 84 may support a track 86. The track 86 may be coupled (e.g., fixed via a fastener) to each of the first and second dividers 84 or may be molded as part of the dividers 84. According to an exemplary embodiment, the cover 36 may include protrusions (e.g., protruding laterally outward from the cover 36) configured to engage the track 86. The track 86 may be configured to support the cover 36 and to facilitate movement of the cover 36 relative to the base 24. According to an exemplary embodiment, one track 86 may be coupled to the wall 82 and the other track 86 may be coupled to a divider 84, and the cover 36 may be configured to slide along the wall 82 and the divider 82 via the tracks 86.

According to an exemplary embodiment as shown schematically in FIG. 5A, the first and second doors 28 may be coupled to the wall 82 by the hinges 31. According to an exemplary embodiment, the first and second doors 28 may pivot relative to the wall 82. As shown schematically in FIG. 5A, the second door 28 is shown in the closed position 32 and the first door 28 is shown in the open position 50 with the first side compartment 58 being substantially uncovered and accessible to the vehicle occupant. The first and second doors 28 may rotate about the respective hinges 31 through any angle to enable access to the respective side compartments according to an exemplary embodiment. According to an exemplary embodiment as shown schematically in FIG. 5A, a set of phantom lines show the first door 28 in intermediate positions during movement of the first door 28 between the open position 50 and the closed position 32.

According to an exemplary embodiment, the first door 28 may substantially cover the first side compartment 58 and engage the divider 84 in the closed position. According to an exemplary embodiment, the second door 28 may enable access to a second side compartment 58 and the cover 36 may enable access to the main compartment 72. According to an exemplary embodiment, any number of storage compartments may be provided and the storage compartments may have any configuration.

Figure 5B:
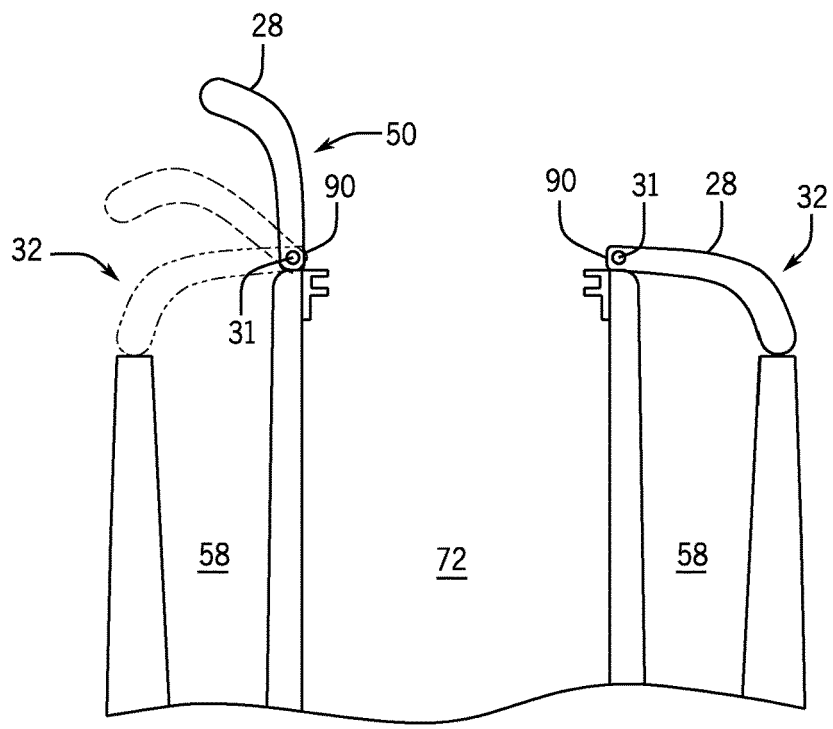
FIG. 5B is a schematic cross-sectional view of an armrest assembly according to an exemplary embodiment.

According to an exemplary embodiment as shown schematically in FIG. 5B, the first and second doors 28 may be pivotally coupled to the first and second dividers 84 of the base 24 via respective hinges 31 positioned at laterally interior edges 90 of the first and second doors 28. According to an exemplary embodiment, the first door 28 may move from the closed position 32 shown by phantom lines to an intermediate position and to the open position 50 via rotation about the hinge 31 in the first direction. According to an exemplary embodiment, the first door 28 may move from the open position 50 to the closed position 32 via rotation in the second direction. According to an exemplary embodiment, the door 28 may engage the wall 82 in the closed position. According to an exemplary embodiment, the second door 28 may move between open and closed positions in a similar manner. According to an exemplary embodiment, the first and second doors 28 may rotate about the respective hinges 31 through any angle to enable access to the respective storage compartments.

According to an exemplary embodiment as shown schematically in FIG. 6A, the first door 28 may be pivotally coupled to the base 24 via an offset pivot 100. According to an exemplary embodiment, the first door 28 may move from the closed position 32 (shown by phantom lines) to the open position 50 via rotation about the offset pivot 100 in a first direction. According to an exemplary embodiment, the first door 28 may extend generally vertically (e.g., along a vertical axis of the base 24) and may be generally parallel to the wall 82 of the base 24 in the open position 50.

According to an exemplary embodiment, the first door 28 may be supported within a recess 104 formed in the wall 82 of the base 24 in the open position 50. According to an exemplary embodiment, an interior lateral edge 106 of the first door 28 may be flush with a vertical edge 108 of the wall 82; the first door 28 may not extend vertically (e.g., along a vertical axis of the base 24) beyond the vertical edge 108 of the wall 82 in the open position 50. According to an exemplary embodiment, less than 75, 50, 25, or 10 percent of the first door 28 may extend vertically beyond the vertical edge 108 of the outer wall 82 while the first door 28 is in the open position 50. Such a configuration may enable access to the first side compartment 58 and avoid or limit interference with the vehicle occupants. According to an exemplary embodiment, the offset pivot 100 may be laterally offset (e.g., along a lateral axis of the support structure 24) from the first armrest portion 28 in the open position 50.

According to an exemplary embodiment, the first door 28 may move from the open position 50 to the closed position 32 via rotation about the offset pivot 100 in a second direction, which may be substantially opposite from the first direction. According to an exemplary embodiment, the offset pivot 100 may be vertically offset (e.g., along a vertical axis of the base 24) from the first door 28 in the closed position 32. According to an exemplary embodiment, the offset pivot 100 may be coupled to any portion of the first door 28 via any components, such as a flange 109 (e.g., connector). According to an exemplary embodiment, the offset pivot 100 may be coupled to the base 24 via any components (e.g., connectors). According to an exemplary embodiment, one or more offset pivots 100 and corresponding flanges 109 may be positioned proximate to the forward end 37 and/or the rear end 39 of the armrest assembly AR.

According to an exemplary embodiment as shown schematically in FIGS. 6B and 6C, the door 28 may be pivotally coupled to the base 24 via a multiple pivot assembly 110. According to an exemplary embodiment, both doors 28 may also be coupled to the base 24 via a respective multiple pivot assembly 110 and may move between open and closed positions in a similar manner. According to an exemplary embodiment, the door 28 may move from the closed position 32 (FIG. 6B) to the open position 50 (FIG. 6C) via the assembly 110. According to an exemplary embodiment, the assembly 110 may include a fixed pivot 114 (e.g., a central pivot) coupled to a first end 116 of a linkage member 118 (e.g., arm) and a first movable pivot 120 coupled to a second end 122 of the linkage member 118. The first movable pivot 120 and a second movable pivot 124 may be supported within a guide member 126 (e.g., track).

Rotation of the door 28 from the closed position 32 may cause the door 28 to initially rotate about the second movable pivot 124 and may cause the second movable pivot 124 to move out of (e.g., disengage from) a recess 128 of the guide member 126. The second movable pivot 124 may disengage from the recess 128; the door 28 may rotate about the fixed pivot 114; and the first and second movable pivots 120, 124 may move (e.g., slide) within the guide member 126. According to an exemplary embodiment, the door 28 may pivotally open and slide along the wall 82 of the base 24 and avoid or limit interference with objects stored within the storage compartment 58 or the vehicle occupants.

According to an exemplary embodiment, the door 28 may extend generally vertically (e.g., along a vertical axis of the support structure 24) and may be generally parallel to the wall 82 of the base 24 in the open position 50. According to an exemplary embodiment, the door 28 may be supported within a recess 130 formed in the wall 82 of the base 24 in the open position 50. According to an exemplary embodiment, an interior lateral edge 121 of the door 28 may be flush with a vertical edge 132 of the wall 82; the door 28 may not extend vertically (e.g., along a vertical axis of the base 24) beyond the vertical edge 132 of the wall 82. According to an exemplary embodiment, less than 75, 50, 25, or 10 percent of the first door 28 may extend vertically beyond the vertical edge 132 of the wall 82 in the open position 50.

According to an exemplary embodiment, the fixed pivot 114 may be laterally offset (e.g., along a lateral axis of the base 24) from the first door 28 when the door 28 is in the open position 50. According to an exemplary embodiment, the door 28 may move from the open position 50 to the closed position 32 via rotation about the fixed pivot 114 of the assembly 110. According to an exemplary embodiment, the fixed pivot 114 may be vertically offset (e.g., along a vertical axis of the base 24) from the first door 28 when the door 28 is in the closed position 32. According to an exemplary embodiment, the assembly 110 may be coupled to any portion of the door 28 via any components, such as a flange 130 (e.g., connector). According to an exemplary embodiment, the linkage assembly 110 may be coupled to the base 24 via any components (e.g., connectors). According to an exemplary embodiment, one or more assemblies 110 and corresponding flanges 130 may be positioned proximate to the forward end 37 and/or the rear end 39 of the armrest assembly 18.

The first and second side compartments 58 may be particularly appropriate in wider floor consoles FC, which may be included in larger vehicles V (e.g. trucks or sport utility vehicles). The door or cover 36 (e.g. tambour door) may perform poorly if it is too wide. Providing side compartments 58 addresses the issue of a tambour door 36 not being wide enough to span across a wide floor console FC while also still using all or nearly all the potential storage space within the floor console FC.

Figure 7A:
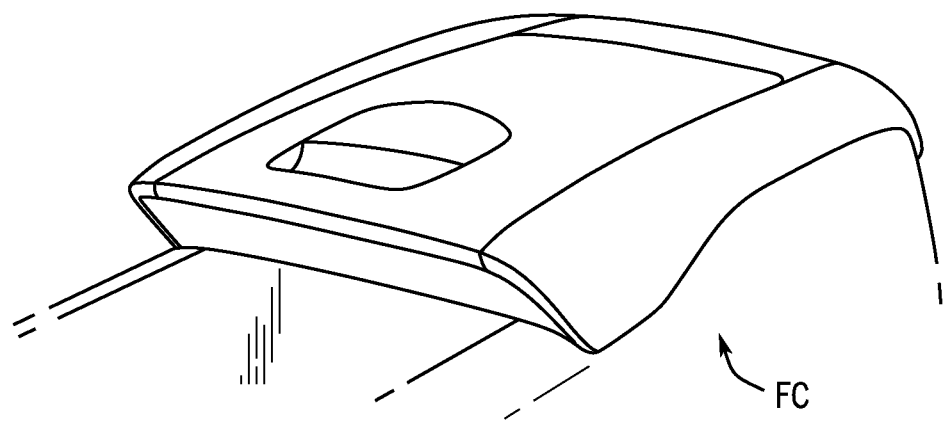
FIG. 7A is a schematic perspective view of a conventional floor console with a sliding cover or tambour door according to an exemplary embodiment.
Figure 7B:
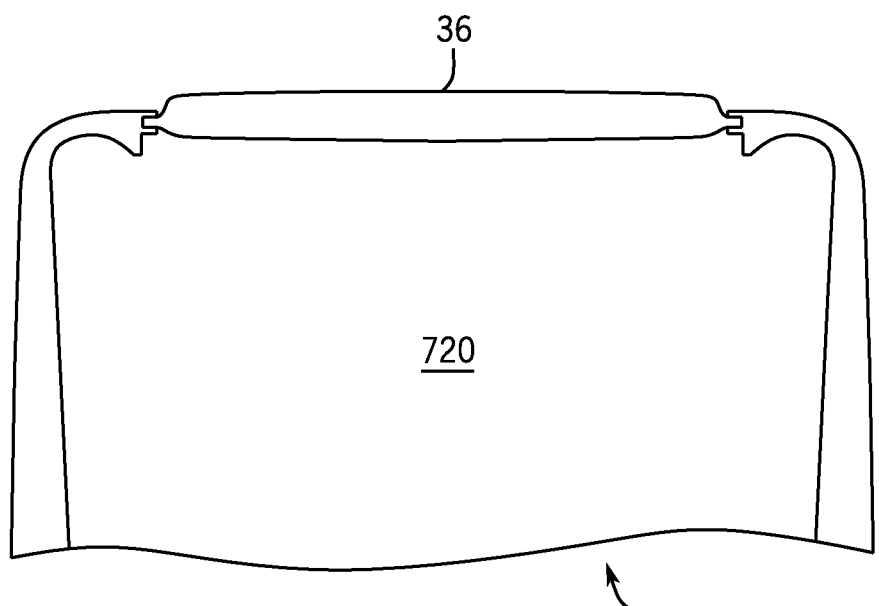
FIG. 7B is a schematic front cross-sectional view of a conventional floor console with a sliding cover or tambour door according to an exemplary embodiment.

According to a conventional embodiment as shown schematically in FIGS. 7A and 7B, a conventional floor console FC includes a single door 36 and a single storage compartment 720.

According to an exemplary embodiment, a conventional floor console with a sliding cover or tambour door may comprise a support structure; an armrest assembly may comprise a first armrest portion adjacent to an opening of the armrest assembly and may be pivotally coupled to the support structure, wherein the first armrest portion may be configured to rotate between a closed position that may substantially cover a first storage compartment within the support structure and an open position that may facilitate access to an interior of the first storage compartment; and a tambour door may be positioned within the opening in the armrest assembly and may be slidable with respect to the first armrest portion between a closed position that may substantially cover a second storage compartment within the support structure and an open position that may facilitate access to an interior of the second storage compartment.

According to an exemplary embodiment of a conventional floor console with a sliding cover or tambour door, the first armrest portion may be pivotally coupled to the support structure via a hinge disposed proximate to a laterally outer edge of the first armrest portion. According to an exemplary embodiment of the vehicle armrest system, the first armrest portion may be pivotally coupled to the support structure via a hinge disposed proximate to a laterally inner edge of the first armrest portion. According to an exemplary embodiment of the vehicle armrest system, the first armrest portion may be pivotally coupled to the support structure via a hinge disposed proximate to a rear edge of the first armrest portion. According to an exemplary embodiment of the vehicle armrest system, the first armrest portion may be pivotally coupled to the support structure via an offset pivot. According to an exemplary embodiment of the vehicle armrest system, the first armrest portion may be pivotally coupled to the support structure via a multiple pivot assembly comprising a fixed pivot and one or more movable pivots. According to an exemplary embodiment of the vehicle armrest system, the armrest assembly may comprise a second armrest portion adjacent to the opening of the armrest assembly and may be pivotally coupled to the support structure, and the second armrest portion may be configured to rotate between a closed position that may substantially cover a third storage compartment within the support structure and an open position that may facilitate access to an interior of the third storage compartment. According to an exemplary embodiment of the vehicle armrest system, the first armrest portion and the second armrest portion may be disposed on opposite lateral sides of the opening within which the tambour door is positioned. According to an exemplary embodiment of the vehicle armrest system, the armrest assembly may comprise a third armrest portion adjacent to the opening and may be pivotally coupled to the support structure, and the third armrest portion may be configured to rotate between a closed position that may substantially cover a fourth storage compartment within the support structure and an open position that may facilitate access to an interior of the fourth storage compartment. According to an exemplary embodiment of the vehicle armrest system, the second storage compartment may be disposed between the first and the third storage compartments along a lateral axis of the support structure. According to an exemplary embodiment of the vehicle armrest system, the second storage compartment may be defined between generally opposed inner walls of the support structure, tracks may be supported by the generally opposed inner walls of the support structure, and the tambour door may comprise protrusions that engage the tracks to facilitate movement of the tambour door along the tracks.

According to an exemplary embodiment, a conventional floor console with a sliding cover or tambour door may comprise a support structure comprising a plurality of storage compartments; an armrest assembly may comprise a first armrest portion and a second armrest portion disposed on laterally opposite sides of an opening of the armrest assembly, wherein each of the first armrest portion and the second armrest portion may be independently pivotally coupled to the support structure; and a tambour door may be positioned within the opening in the armrest assembly and may be slidable with respect to the support structure between a closed position that may substantially cover a first storage compartment of the plurality of storage compartments and an open position that may facilitate access to an interior of the first storage compartment of the plurality of storage compartments. According to an exemplary embodiment of the vehicle armrest system, the first armrest portion may be configured to move between a closed position that may substantially cover a second storage compartment of the plurality of storage compartments and an open position that may facilitate access to an interior of the second storage compartment of the plurality of storage compartments, and the second armrest portion may be configured to move between a closed position that may substantially cover a third storage compartment of the plurality of storage compartments and an open position that may facilitate access to an interior of the third storage compartment of the plurality of storage compartments.

According to an exemplary embodiment of the vehicle armrest system, the first armrest portion may be configured to independently pivot relative to the support structure via respective offset pivots. According to an exemplary embodiment of the vehicle armrest system, the first armrest portion may be configured to independently pivot relative to the support structure via a hinge disposed at a laterally outer edge of the first armrest portion. According to an exemplary embodiment of the vehicle armrest system, the support structure may comprise opposed laterally interior walls configured to separate at least some of the plurality of storage compartments from one another, and tracks that may be configured to support the tambour door are coupled to the laterally interior walls.

According to an exemplary embodiment, a vehicle armrest system may comprise a support structure comprising a central storage compartment disposed between laterally outer storage compartments; an armrest assembly may be coupled to the support structure, wherein the armrest assembly may comprise a first armrest portion configured to enable access to one of the laterally outer storage compartments and a second armrest portion configured to enable access to another one of the laterally outer storage compartments; and a tambour door that may be positioned within an opening in the armrest assembly and may be configured to move relative to the support structure to enable access to the central storage compartment. According to an exemplary embodiment of the vehicle armrest system, the first armrest portion and the second armrest portion may be independently pivotally coupled to the support structure and are configured to independently rotate relative to the support structure to enable access to the respective one of the laterally outer storage compartments. According to an exemplary embodiment of the vehicle armrest system, the first armrest portion and the second armrest portion may be independently pivotally coupled to the support structure via respective offset pivots to enable access to the respective one of the laterally outer storage compartments. According to an exemplary embodiment of the vehicle armrest system, the support structure may comprise laterally opposed interior walls that separate the central storage compartment from the laterally outer storage compartments, and the tambour door may be slidingly supported by tracks extending along each of the laterally opposed interior walls.

While certain mechanisms (e.g., hinges, offset pivots, linkage assemblies) to facilitate moving the movable doors or armrest portions between open and closed positions are disclosed, the disclosed exemplary embodiments may include any mechanism configured to independently move the movable doors or armrest portions between the closed position 32 in which the corresponding compartment is substantially covered and the open position 50 in which the corresponding storage compartment is substantially uncovered. The various features of the exemplary embodiments disclosed herein may be combined in any manner.

While only certain features and exemplary embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative exemplary embodiments. It is, therefore, to be understood that the appended claims are intended to cover all such modifications and changes as fall within the true spirit of the invention. In an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

It is important to note that the construction and arrangement of the elements of the inventive concepts and inventions as described in this application and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

It is important to note that the apparatus of the present inventions can comprise conventional technology (e.g. as implemented in present configuration) or any other applicable technology (present or future) that has the capability to perform the functions and processes/operations indicated in the FIGURES. All such technology is considered to be within the scope of the present inventions and application.

The invention claimed is:

1. A component for a vehicle interior comprising:
   (a) a base comprising (1) a first divider configured to form a main compartment and a first side compartment and (2) a second divider configured to form the main compartment and a second side compartment;
   (b) a cover configured to enclose the main compartment;
   (c) a first door configured to enclose the first side compartment; and
   (d) a second door configured to enclose the second side compartment;
   wherein the cover is configured to extend between the first divider and the second divider and move along the first divider and the second divider to uncover the main compartment.

2. The component of claim 1 wherein the cover is configured to move along a path between a cover closed position that substantially covers the main compartment and a cover open position that substantially uncovers the main compartment; and wherein at least one of the first door and the second door is configured to rotate about an axis substantially parallel to the path of movement of the cover between (a) a door closed position that substantially covers at least one of the first side compartment and the second side compartment and (b) a door open position that substantially uncovers the at least one of the first side compartment and the second side compartment.

3. The component of claim 1 wherein the first divider comprises a first track and the second divider comprises a second track; and wherein the cover is configured to engage the first track and the second track.

4. The component of claim 1 wherein the first door is configured to move between (a) a door closed position to enclose the first side compartment and (b) a door open position to uncover the first side compartment; and wherein the cover is configured to move in order to enclose and uncover the main compartment when the first door is in the door closed position and the door open position.

5. The component of claim 4 wherein the base comprises a first wall and a second wall laterally opposed to the first wall; wherein the first door is coupled to the first wall by a hinge; and wherein the first door is configured to engage the first divider when the first door is in the door closed position to substantially cover the first side compartment.

6. The component of claim 5 wherein the first door is configured to (a) pivot relative to the first wall and (b) slide along the first wall as the first door moves from the door closed position to the door open position.

7. The component of claim 4 wherein the base comprises a first wall and a second wall laterally opposed to the first wall; wherein the first door is coupled to the first divider by a hinge; and wherein the first door is configured to engage the first wall when the first door is in the door closed position to substantially cover the first side compartment.

8. The component of claim 7 wherein the first door comprises a mechanism configured to secure the first door to the first wall.

9. A component for a vehicle interior comprising:
   (a) a base comprising a main compartment and a side compartment;
   (b) a divider of the base configured to form the main compartment and the side compartment;
   (c) a cover configured to move along a path between a cover closed position that substantially covers the main compartment and a cover open position that substantially uncovers the main compartment; and
   (d) a door configured to move between a door closed position that substantially covers the side compartment and a door open position that substantially uncovers the side compartment;
   wherein the door is configured to rotate about an axis substantially parallel to the path of movement of the cover; and
   wherein the cover and the door comprise an armrest assembly.

10. The component of claim 9 wherein the cover is configured to move between the cover closed position and the cover open position when the door is in the door closed position and when the door is in the door open position.

11. The component of claim 9 wherein the base comprises a wall; and
    wherein the door is configured to extend between the wall and the divider in the door closed position.

12. The component of claim 9 wherein the base comprises a wall; wherein the door is coupled to the wall by a hinge; and wherein the door is configured to engage the divider when the door is in the door closed position to substantially cover the side compartment.

13. The component of claim 12 wherein the hinge comprises at least one of (a) an offset pivot, (b) a pivot assembly comprising a fixed pivot and at least one movable pivot.

14. The component of claim 9 wherein the base comprises a wall; wherein the door is coupled to the divider by a hinge; and wherein the door is configured to engage the wall when the door is in the door closed position to substantially cover the side compartment.

15. The component of claim 9 wherein the door comprises an armrest portion.

16. A vehicle armrest system comprising:
    (a) a support structure comprising a first outer storage compartment, a second outer storage compartment, and a central storage compartment between the first outer storage compartment and the second outer storage compartment; and
    (b) an armrest assembly coupled to the support structure;
    wherein the armrest assembly comprises a first armrest portion configured to cover and to uncover the first outer storage compartment and a second armrest portion configured to cover and uncover the second outer storage compartment; and
    wherein the armrest assembly comprises a cover configured to slide relative to the support structure to enable access to the central storage compartment.

17. The vehicle armrest system of claim 16 wherein the cover is configured to slide between a closed position and an open position relative to the support structure to enable access to the central storage compartment; wherein the armrest assembly is configured so that independent of position of the cover at least one of (a) the first outer storage compartment can be covered or uncovered by the first armrest portion or (b) the second outer storage compartment can be covered or uncovered by the second armrest portion.

18. The vehicle armrest system of claim 16 wherein the support structure comprises a first interior wall and a second interior wall laterally opposed to the first interior wall; wherein the first interior wall and the second interior wall are configured to separate the central storage compartment from the first outer storage compartment and the second outer storage compartment; and wherein the cover is supported by a first track extending along the first interior wall and a second track extending along the second interior wall.

19. The vehicle armrest system of claim 16 wherein the cover is configured to move along a direction relative to the support structure to enable access to the central storage compartment; and wherein the first armrest portion is configured to rotate about an axis substantially parallel to the direction of movement of the cover.

20. The vehicle armrest system of claim 16 wherein the first armrest portion and the second armrest portion are independently pivotally coupled to the support structure and configured to rotate relative to the support structure to enable access to the first outer storage compartment and the second outer storage compartment.

* * * * *